United States Patent [19]
Diesen et al.

[11] Patent Number: 5,547,629
[45] Date of Patent: Aug. 20, 1996

[54] METHOD FOR MANUFACTURING A ONE-PIECE MOLDED COMPOSITE AIRFOIL

[75] Inventors: David Diesen, Mesa; William R. Olsen, Jr., Phoenix, both of Ariz.

[73] Assignee: Competition Composites, Inc., Phoenix, Ariz.

[21] Appl. No.: 313,348

[22] Filed: Sep. 27, 1994

[51] Int. Cl.⁶ .................................................. B29C 70/44
[52] U.S. Cl. ......................... 264/257; 264/258; 264/313; 264/334
[58] Field of Search ................................... 264/257, 258, 264/313, 334

[56] References Cited

U.S. PATENT DOCUMENTS

| | | | |
|---|---|---|---|
| 1,393,541 | 10/1921 | Kemp | 264/258 |
| 2,693,922 | 11/1954 | Ellison et al. | 244/123 |
| 2,773,792 | 12/1956 | Nesbesar | 156/191 |
| 3,349,157 | 10/1967 | Parsons | 264/258 |
| 3,795,559 | 3/1974 | Horn et al. | 264/313 |
| 3,902,944 | 9/1975 | Ashton | 156/245 |
| 3,962,506 | 6/1976 | Dunahoo | 156/156 |
| 3,967,996 | 7/1976 | Kamov et al. | 156/156 |
| 4,169,749 | 10/1979 | Clark | 264/314 |
| 4,361,533 | 11/1982 | Jenks et al. | 264/258 |
| 4,565,595 | 1/1986 | Whitener | 264/258 |
| 4,650,534 | 3/1987 | Mussi et al. | 264/258 |
| 5,013,507 | 5/1991 | Julien et al. | 264/257 |
| 5,087,187 | 2/1992 | Simkulak et al. | 264/258 |
| 5,096,649 | 3/1992 | Hansson | 264/258 |
| 5,248,242 | 9/1993 | Lallo et al. | 264/258 |

FOREIGN PATENT DOCUMENTS 2-155633  6/1990  Japan .................................. 264/258

*Primary Examiner*—Robert Davis
*Attorney, Agent, or Firm*—LaValle D. Ptak

[57] ABSTRACT

One piece hollow airfoils are manufactured from molded carbon filament materials, with internal support structures integrally formed in a single closed mold operation. The outer skins and the internal reinforcement structure all are cured together as an integral unit. To accomplish this, a mold having a cavity defining the outer shape of the airfoil is opened. Precut, pre-preg fiber material and core material then is placed in the mold halves. At least two adjacent elongated resilient mandrels are placed in contact with the precut sheets of pre-preg fiber to press the sheets and core into contact with the mold upon subsequent closure thereof. An elongated web of pre-preg fiber material is placed between the adjacent mandrels, and in contact with them, to cause said edges of the web to contact the sheets of pre-preg fiber material on opposite sides of the mold cavity. The mold is closed; and heat is applied to cure the pre-preg fiber material and to bond the web with the precut sheets. After the airfoil is removed from the cavity, the resilient mandrels are removed by pulling them from an open end of the airfoil. This causes the mandrels to stretch and contract as they are removed from the airfoil.

6 Claims, 4 Drawing Sheets

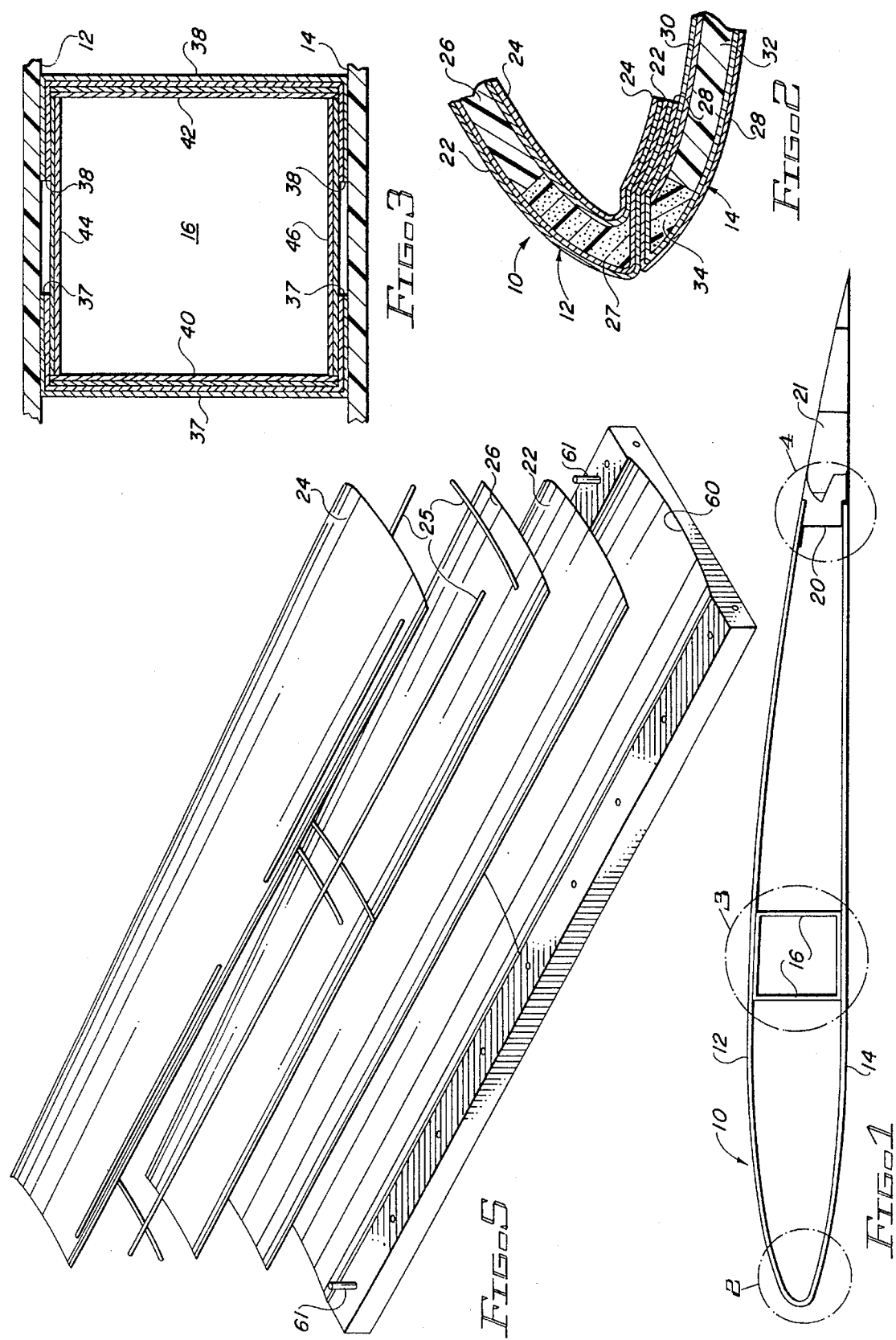

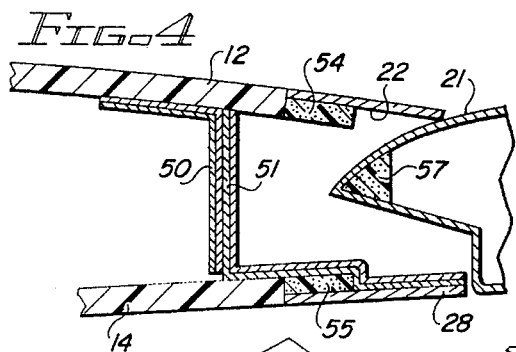
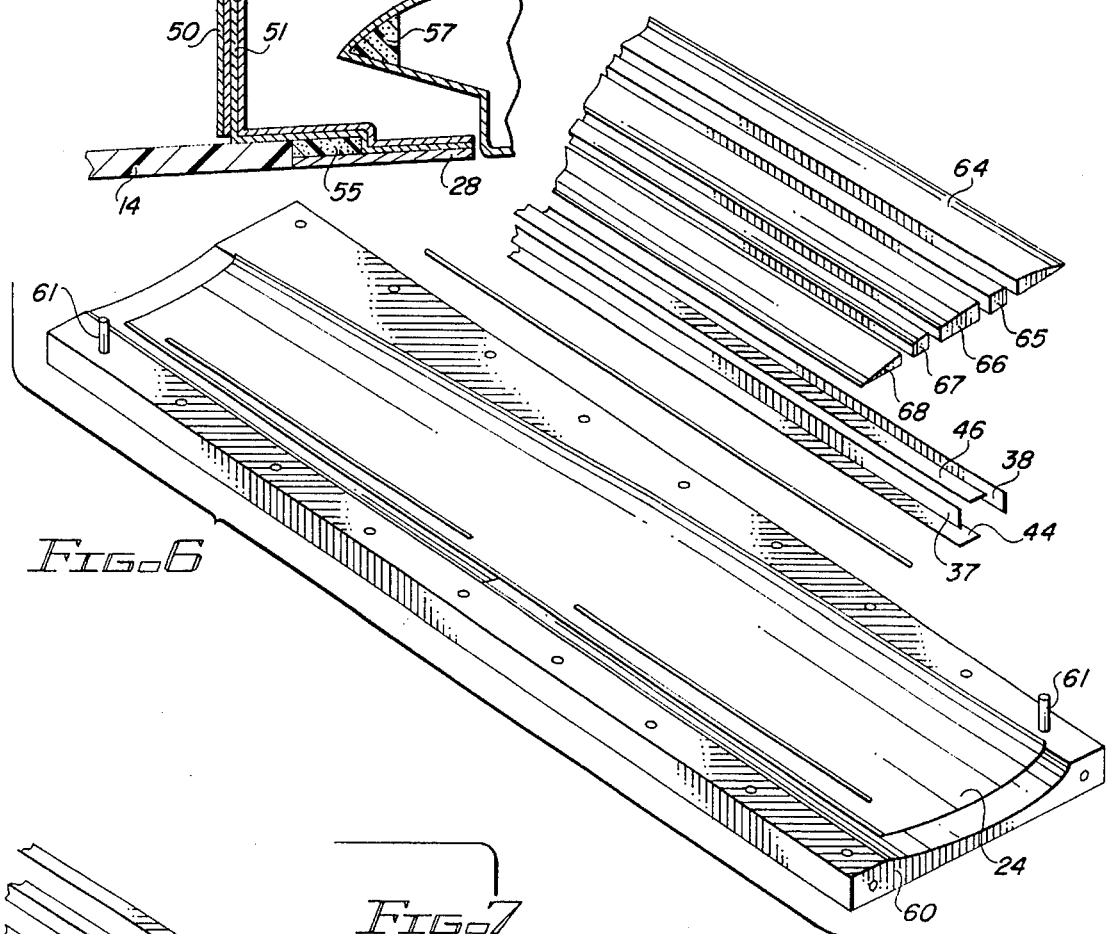
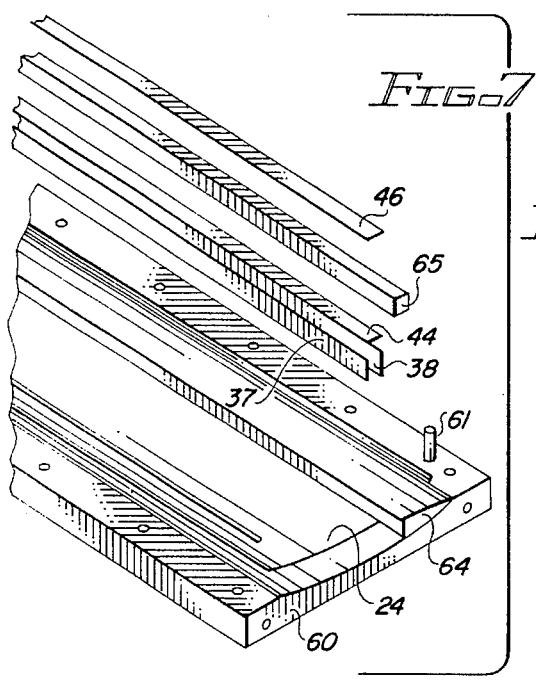
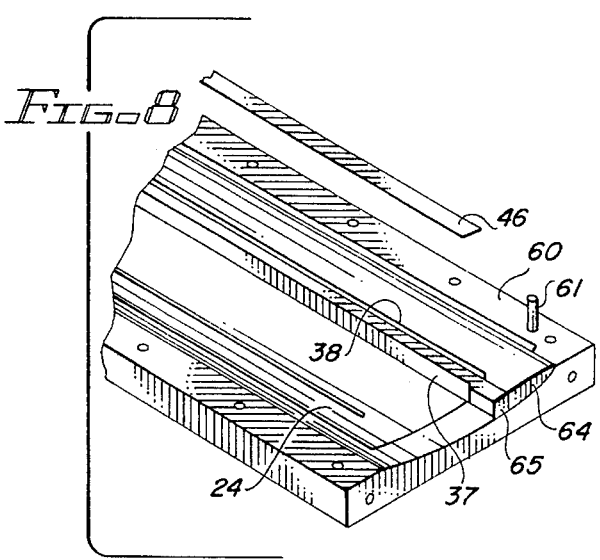

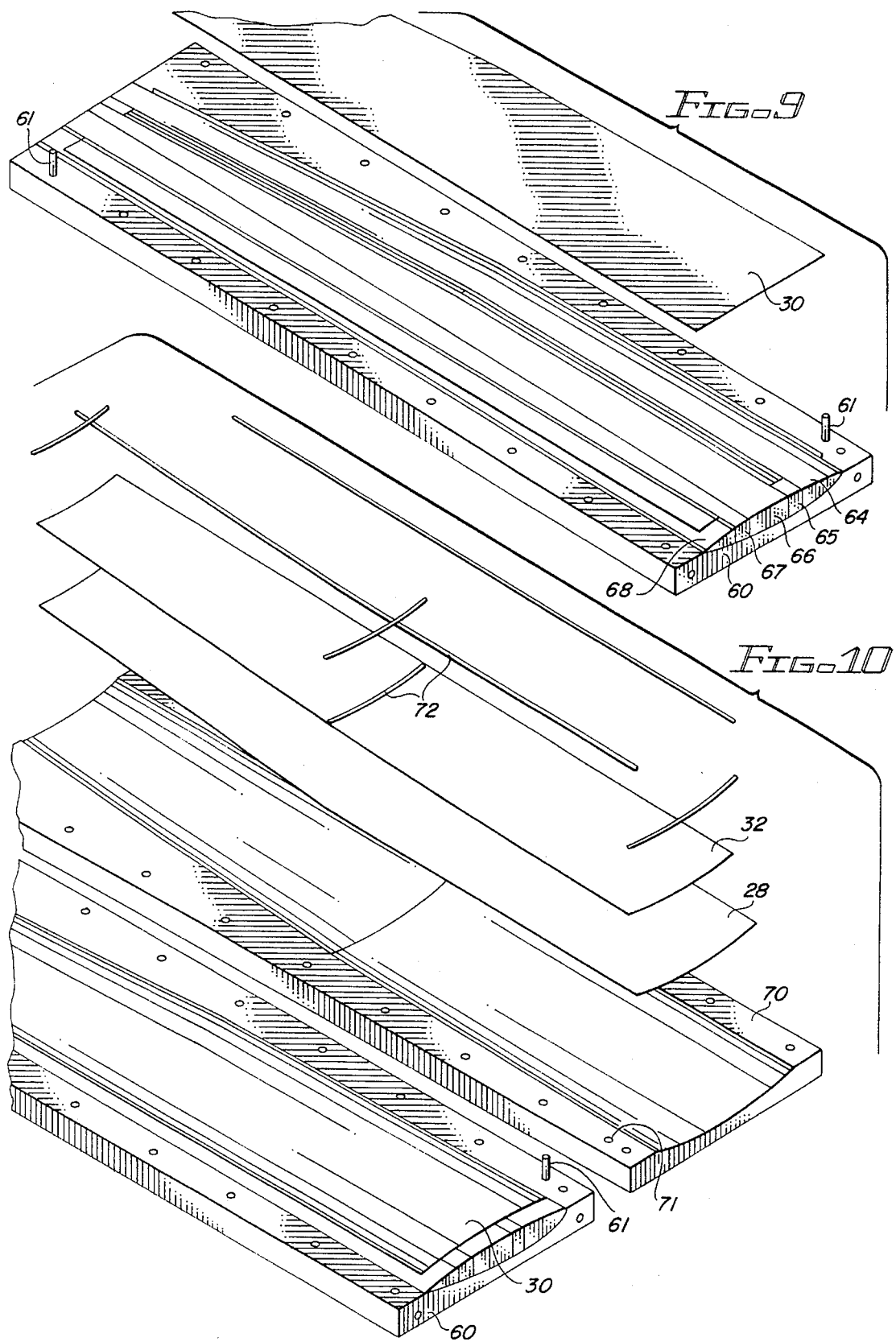

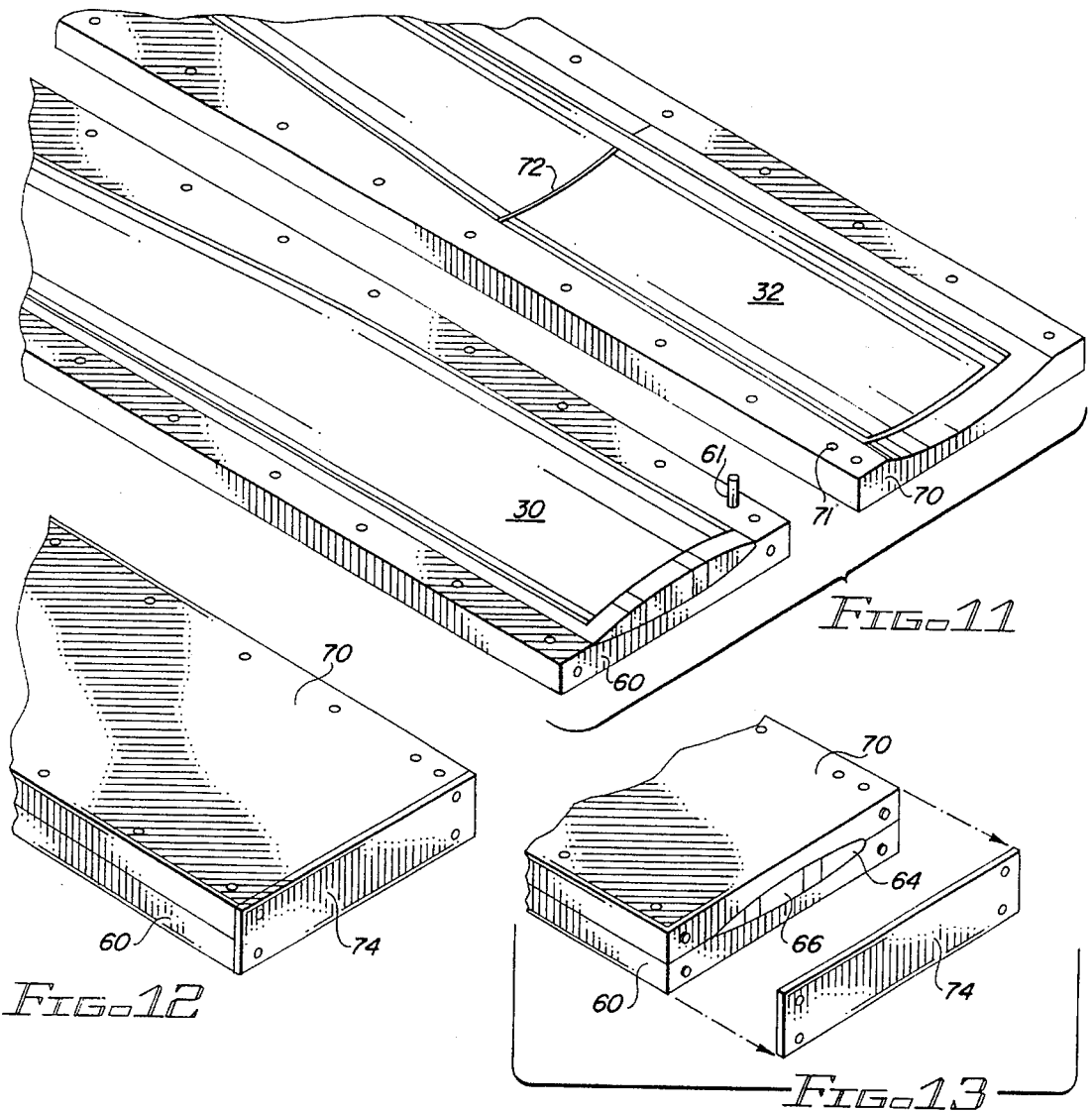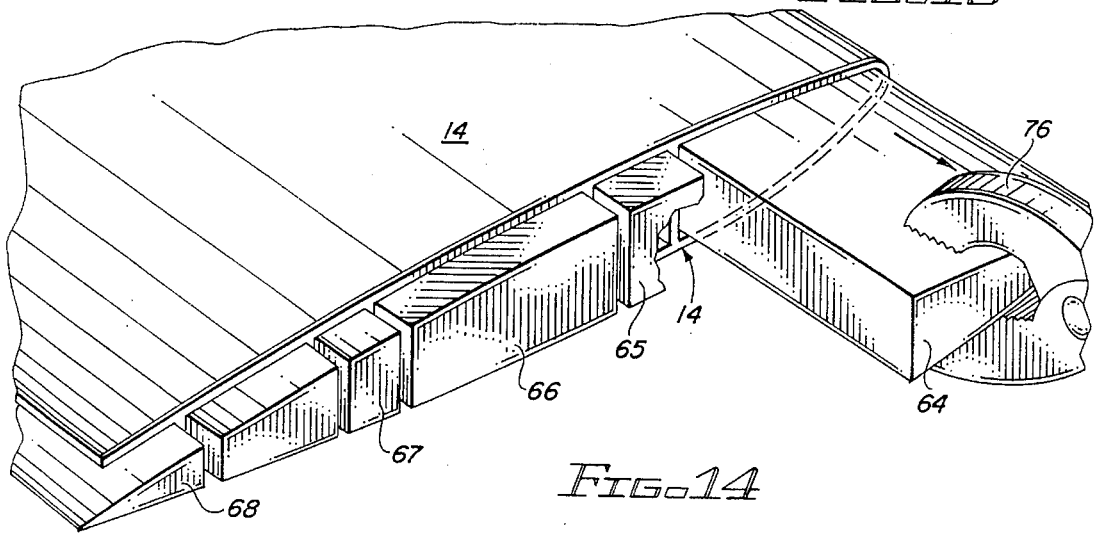

5,547,629

METHOD FOR MANUFACTURING A ONE-PIECE MOLDED COMPOSITE AIRFOIL

BACKGROUND

Hollow airfoils used as helicopter rotor blades, steering rotors, wings, elevators, rudders, and the like, have been made of a variety of different materials employing various methods of manufacture. Such airfoils have been made of metal such as aluminum, and, increasingly, have been manufactured of composite fiber materials, such as glass, plastic, molded carbon filament, and the like. To produce hollow airfoils of such composite fiber materials, relatively complicated multi-step manufacturing processes are used.

For example, U.S. Pat. No. 4,169,749 discloses a method for making a hollow aircraft rotor blade from laminated material. An expandable mandrel first is constructed from curable materials. A composite build up of epoxy materials then is made by layering a plurality of pre-preg plies of curable material over the expandable mandrel. The mandrel and epoxy build up materials then are placed in a mold to define the configuration of the outer surface of the airfoil. Pressure is applied to expand the mandrel, which in turn expands the build up of material against the mold. The mandrel and composite build up of material then are cured with the mandrel becoming an integral part of the rotor blade.

Another approach is disclosed in U.S. Pat. No. 3,967,996. In this patent, a hollow airfoil is manufactured by forming a blank of single sheets with an adhesive substance applied to them. The sheets are stacked onto a mandrel and placed in a mold. Preliminary compression is employed to provide the blank with a stiffness and shape in an unclosed profile. The blank ends are brought together to create a cavity, which accommodates an elastic bag. The blank with the bag in it is placed in a mold, and air pressure is fed into the elastic bag to perform a final pressing of the sheets onto the internal surfaces of the mold.

The U.S. Pat. No. 2,773,272 discloses a method of making a laminated airfoil structure. The airfoil of this patent is of a non-uniform (that is, tapered) cross section. A precut plastic core first is compressed in the mold, around a longitudinal center spar. The mold is opened and the core pieces are removed. The upper and lower skins for the airfoil then are placed on opposite sides of the mold, and the precut plastic core and spar are placed between them. Everything then is cured together; so that the airfoil itself is not hollow, but has a plastic core in it.

The U.S. Pat. No. 3,962,506 is directed to a complex multi-step procedure for forming helicopter blades. Inflatable inserts are used in each of the different curing steps to press the parts against the mold; so that the final result is a structure with internally formed longitudinal supports or spars. The multi-chambered blade, however, is not formed in a single curing operation, but requires multiple curing steps in order to provide the hollow blade with internal supports.

The U.S. Pat. No. 4,565,595 is directed to a method of making a composite aircraft wing. This patent is similar in many respects to U.S. Pat. No. 3,962,506. Several separate inflatable mandrels are stacked together in the process of the '595 patent. The covering layers then are placed over these various mandrels. The assembly is placed in a mold; the mandrels are inflated; and the wing is cured. The mandrels then are deflated and removed from the final structure.

Another U.S. patent directed to a method for producing a hollow helicopter rotor blade is U.S. Pat. No. 5,248,242. The rotor blade of this patent is manufactured with a variety of separate pieces laid up together to form a core inside the blade. This includes a pre-cured bridge, along with a machined core. Wrapping around a mandrel forming the forward part of the blade functions to create a longitudinal reinforcing spar in the finished product. Along with the placement of solid core members, which remain in the blade after it is cured, an inflatable rubber bag also is included. The bag is inflated during the curing process. This is a complex, multiple step process.

It is desirable to provide a method for manufacturing a hollow, one-piece, molded composite airfoil with integral reinforcing members in it, which overcomes the disadvantages of the prior art listed above, and which is simple and effective.

SUMMARY OF THE INVENTION

It is an object of this invention to provide an improved process for manufacturing an airfoil.

It is another object of this invention to produce an improved one-piece molded airfoil from composite materials.

It is an additional object of this invention to provide a simple method for manufacturing a hollow airfoil from composite materials.

It is a further object of this invention to produce a hollow one-piece molded airfoil with integrally formed internal struts using resilient rubber mandrels, which are removed from the airfoil after curing.

In accordance with a preferred embodiment of this invention, a method of manufacturing a one-piece hollow airfoil with integral reinforcing members is effected by placing precut sheets of pre-preg fiber material on opposite surfaces of an open mold cavity. At least two adjacent elongated resilient mandrels are placed in contact with the sheets of pre-preg fiber on one part of the mold cavity; and an elongated web of pre-preg fiber material is placed between the adjacent mandrels. Opposite edges of the elongated web contact the sheets of pre-preg fiber material on opposite sides of the mold cavity when it is closed. When the mold is closed, the resilient mandrels firmly press the sheets of pre-preg fiber material against the sides of the cavity. Heat is applied to the mold to cure the pre-preg fiber material, which in turn bonds the elongated web to the sheets on opposite sides of the resilient mandrels. After the cured airfoil is removed from the mold, the resilient mandrels are pulled from an open end of the airfoil. The mandrels stretch and contract as they are removed.

BRIEF DESCRIPTION OF THE DRAWINGS

FIG. 1 is a cross-sectional view of an airfoil constructed in accordance with the method of a preferred embodiment of the invention;

FIG. 2 is an enlarged detail of the portion circled as 2 in FIG. 1;

FIG. 3 is an enlarged detail of the portion circled as 3 in FIG. 1;

FIG. 4 is an enlarged detail of the portion circled as 4 in FIG. 1;

FIGS. 5 through 11 are exploded views illustrating different steps in the manufacturing method of a preferred embodiment of the invention;

FIG. 12 illustrates the structure during a final stage of the method of the invention;

FIG. 13 is an exploded view illustrating a step in the method of the invention; and FIG. 14 is an enlarged detail view illustrating a final step in practicing the method of the invention.

DETAILED DESCRIPTION

Reference now should be made to the drawings, in which the same reference numbers are used throughout the different figures to designate the same components. FIG. 1 is a cross-sectional view of a one-piece molded wing or airfoil made from composite materials, such as carbon, fiberglass, KELVAR®, or the like. The airfoil 10 shown in FIG. 1 is a hollow airfoil including an upper fairing skin 12 and a lower fairing skin 14, with an internal spar box support 16 approximately at the midpoint of the airfoil. The spar box 16 extends longitudinally of the airfoil 10. At the trailing edge of the airfoil 10, an additional support spar 20 is provided near the open end of the airfoil where a flap or aileron 21 is assembled by any suitable process.

FIG. 2 is an enlarged detail of the leading edge of the airfoil, which also illustrates the construction employed for the fairing skins 12 and 14. As illustrated in FIG. 2, the fairing skins 12 and 14 each are constructed of multiple layers of materials. The upper fairing skin 12 includes an inner layer comprised of two thin plies 24 of uni-directional carbon 0/90 (for example, each having a thickness of 3 mils). The uni-directional fibers of the carbon, for the airfoil illustrated in FIG. 1, extend longitudinally of the length of the airfoil (perpendicularly into the paper as viewed in FIG. 2). The two-ply layer 24 of uni-directional carbon 0/90 comprises the inner surface of the airfoil and the outer surface consists of a similar construction of two plies 22 of 3 mil uni-directional carbon 0/90, which is separated from the inner skin 24 by a thin sheet of ROHACELL® lightweight core material to provide a sandwich structure for the airfoil skin. The skin is very durable and lightweight, and does not crush down. Other materials which may be used for the core 26 are a variety of honeycomb materials which are used in airfoil structures, such as DIVINICELL® and the like.

All of these materials are pre-preg materials, which are pre-impregnated with resin to control the resin content of the material. By utilizing pre-preg materials, an accurate control of the final weight of the airfoil is obtained. For the method of manufacture which is described subsequently, the resin selected is a thermoset resin which cures at an elevated curing temperature. As mentioned previously, the fiber in the fairing skin layers 22 and 24 may be made of a variety of different types, with different weaves and fiber orientation and thickness. By utilizing different orientations and thickness, the amount of flexibility for different structural needs and weights is achieved. Typically, for a wing spar or a helicopter rotor blade, the orientation of the fibers is longitudinal or extending in the direction of the primary length of the airfoil.

For the lower fairing skin 14, a similar structure is employed. The inner skin is made of two plies 30 of 3 mil thickness of uni-directional carbon 0/90. This skin is separated from a similar outer skin 28 by a ROHACELL® core 32. The lower fairing skin 14 is constructed in the same manner as the upper fairing skin 12.

As shown in FIG. 2, the Rohacell® cores 26 and 32 do not extend all of the way to the tip of the leading edge of the airfoil. The region between the outer and inner fairing skins 22 and 24 and the outer and inner skins 28 and 30 at the leading edge is filled with a syntactic foam 27 and 34, respectively, for the upper and lower fairing skins 12 and 14. The syntactic foam expands at elevated temperatures. In its original state the foam 27, 34 is tacky and soft; so that it also may be used to tack down the ROHACELL® core materials 26 and 32 to keep the ROHACELL® material in position when the mold halves are joined together, as described subsequently. The material used for the foam areas 27 and 34 is selected to expand up to ten times its original volume, creating pressure along the leading edge of the wing during the molding process to ensure a smooth surface. This syntactic foam material also is used in other parts of the wing structure, such as the core parameter, close out areas, trailing edges, and the like, as explained in greater detail subsequently. Also, as shown in FIG. 2, the outer skin layers 22 and 28 are folded over to the inside of the airfoil at the leading edge to overlap one another.

FIG. 3 illustrates a detail of the spar box 16 or longitudinal internal support extending the length of the airfoil. The spar box 16 also is constructed of pre-preg fiber material, and in the wing under discussion, is made of four plies of pre-preg 3 mil uni-directional carbon 0/90. As shown in FIG. 3, the vertical members of the spar box 16, toward the leading edge of the airfoil 10, consist of two two-ply layers 37 and 40 of the uni-carbon material. Similarly, the vertical members of the spar box toward the trailing edge of the airfoil 10 consist of two two-ply layers 38 and 42 of uni-directional carbon pre-preg fiber. As illustrated, the two outer layers 37 and 38 are folded inwardly to face one another in contact with the inner surfaces of the fairing skin structures 12 and 14. A top cap 44 and a bottom cap 46, each made of two plies of 3 mil pre-preg uni-directional carbon 0/90 then are pressed against the folded over ends 37/38 adjacent the inner surfaces of the fairing skins 12 and 14.

FIG. 4 illustrates the trailing edge structure of the airfoil of FIG. 1. A support comprised of two two-ply layers 50 and 51 of 3 mil pre-preg uni-directional carbon 0/90 forms a vertical spacer support at the open trailing edges of the airfoil for receiving the flap/aileron knuckle hinge and wiper assembly of the flap or aileron 21, as illustrated. As shown in FIG. 4, the two ply layers 50 and 51 each are bent in a generally L-shaped configuration to overlie the inner surface of the corresponding fairing skins 12 and 14 to provide a secure bonding to the fairing skins in the curing process during the manufacture of the airfoil. It also should be noted that syntactic foam plugs 54 and 55 are provided near the trailing edges of the airfoil at the termination point of the ROHACELL® cores 26 and 32 to provide structural integrity along the trailing edge of the airfoil. If a flap or aileron knuckle hinge and wiper assembly is not used, the trailing edge of the airfoil may be closed in the same manner as the leading edge shown in FIG. 2. This latter type of construction would be used for helicopter rotor blades, for example.

To manufacture the one-piece molded airfoil described above in conjunction with FIGS. 1 through 4, the method described in conjunction with FIGS. 5 through 14 is employed. A two-piece machined mold, capable of withstanding high curing temperatures during the oven cure of the pre-preg material used to construct the airfoil, is utilized. The mold consists of an upper half 60 and a lower half 70 (shown most clearly in FIG. 11). In the first steps of construction of the airfoil, the upper half 60 of the mold is exposed, as shown in FIG. 5. The mold half 60 includes some projecting pins 61 about its periphery (only two of which are shown), which mate into corresponding receiving holes 71 in the lower half 70 of the mold when the mold is closed for the curing step of the process.

As shown in FIG. 5, the top half 60 of the mold is placed with the cavity facing upward. The cavity formed by the mold halves 60 and 70 is formed to provide the desired outer shape for the airfoil. The airfoil which is formed in the mold 60/70 may be of uniform cross section throughout its length; or it may be tapered. The cavity also may be used to produce an airfoil section which is open at both ends, or closed at one end and open at its base end. The method which is described subsequently may be used to produce either uniform cross section airfoils or tapered airfoils. With the mold half 60 (the top of the airfoil 10) positioned as shown in FIG. 5, the structural parts which form the fairing skin 12 then are placed in the mold.

As illustrated in FIG. 5, the two precut plies 22 of the pre-preg uni-directional carbon 0/90 material are first placed in the mold to contact the mold surface. Next, the precut sections of the ROHACELL® core layer 26 are placed on top of the two-ply pre-preg fiber layer 22. Thin carbon stiffener rods 25 are placed along the edges of the ROHACELL® core material 26 and also at selected spaced intervals between the different sections along the length. The stiffener rods 25 contact the pre-preg carbon fiber sheet 22, and butt against the ends of the sections of ROHACELL® core 26. The carbon stiffeners 25 provide a structural bond between the inner and outer skins of the sandwich structure comprising the fairing skin 12. These stiffeners 25 prevent delamination of the outer and inner carbon fiber skins 22 and 24, respectively, and the ROHACELL® core 26. This provides structural integrity in key areas, namely the leading and trailing edges of the airfoil and at spaced intervals along its length. It also should be noted that syntactic foam (not shown) may be placed in any gaps between the stiffeners 25 and the core 26; so that the foam completes the integral structure during the subsequent curing step. After the stiffeners 25 and foam 26 layer is in place, the inner two-ply layer 24 of pre-preg uni-directional carbon 0/90 is laid in place. The result of this structure is shown in FIG. 6.

As further shown in FIG. 6, an important feature of the invention next is utilized. This constitutes the use of resilient rubber mandrels or rubber plugs, which are formed as an initial construction step in conjunction with the airfoil provided by the mold halves 60 and 70. The plugs are shown as a five-section unit 64, 65, 66, 67 and 68 in FIG. 6. The plug unit, however, is created by using sheet wax inside the mold halves 60 and 70 to create a slightly undersized cavity prior to the construction of an airfoil in the mold. The cavity is closed; and a two-part silicon rubber is poured into the cavity. The rubber then is cured or solidified in a conventional manner. The wax sheet is selected to have a thickness which is slightly less than the desired thickness of the completed fairing skin section 12 or 14. This takes into consideration the skin thickness of the airfoil part which is to be constructed in the mold sufficient to create pressure for a good laminated structure, as illustrated in detail in the cross-sectional portion of FIG. 2, and still permit the resilient mandrels or plugs 64 to 68 to be withdrawn from the part after it has been cured.

Once the one-piece rubber part consisting of all of the sections 64 through 68 has been formed, it is removed from the mold. The rubber then is longitudinally split and trimmed at the locations where vertical webs or spars are to be formed in the part. It should be noted that the resilient rubber mandrels 64 through 68 are solid, with no metal core in them; so that in the final step of the method of manufacturing the airfoil, the mandrels or plugs may be extracted from an open end of the airfoil by stretching them (causing a transverse contraction) to permit removal of the plugs from the finished airfoil.

As illustrated in FIG. 6, the number of sections 64 through 68 of resilient mandrels is determined by the internal spar boxes or longitudinal spars or supports which are to be provided for any given airfoil. Also as shown in FIG. 6, the spar box parts 37, 38, 44 and 46 of the spar box shown in detail in FIG. 3 are illustrated in exploded form prior to the placement of the rubber mandrels 64 through 68 and the parts for the spar box in the mold 60.

FIGS. 7 and 8 illustrate additional steps in the build up of the spar box 16. As shown in FIG. 7, the leading edge mandrel or plug section 64 first is placed on the pre-preg carbon skin sheet 24, as shown. Next, the pre-preg stiffener vertical sections 37 and 38 (which include the inner layers 40 and 42 shown in FIG. 3) have the top section 44 (shown in detail in FIG. 3) placed across them, as shown in FIG. 3. Next, the resilient rubber mandrel or plug 65 is placed between the members 37 and 38, as shown most clearly in FIG. 8; and the unit is placed, as shown in FIG. 8, against the vertical edge of the leading edge resilient mandrel Finally, the part 46 is placed over the mandrel 65.

As shown in FIG. 9, subsequent steps are used to place the other sections of mandrels 66, 67 and 68 in place on the mold over the inner skin 24. For additional spars or spar boxes, the parts of the spars are placed between adjacent sections of the resilient mandrels, such as 66 and 67, and between 67 and 68, in the same manner described above for the spar box 16. It should be noted, as shown most clearly in FIGS. 7 and 8, that the resilient mandrels 64 through 68 extend toward the right, beyond the right-hand edge of the composite fairing skin for the upper surface of the airfoil to the edge of the mold. As shown in FIGS. 6, 7 and 8, the fairing skin sandwich structure does not extend to the outer edge of the mold half 60, but terminates short of this outer edge.

As illustrated in FIG. 9, once the rubber mandrels are in place, along with all of the internal longitudinal reinforcement spar boxes and spars, the two-ply layer 30 of 3 mil pre-preg uni-directional carbon 0/90, forming the inner skin of the lower fairing skin 14 of the wing section, is placed over the resilient rubber plugs, as indicated in FIG. 9, and as shown in FIG. 10. The remainder of the lower half of the airfoil fairing skin 14 then is built up in the lower half section 70 of the mold in the same manner as described above for the build up of the upper half. As illustrated in FIG. 10, the outer two plies 28 of 3 mil pre-preg uni-directional carbon 0/90 are placed in the mold half 70, followed by the sections 32 of ROHACELL® core along with carbon stiffener rods 72 comparable to the rods 25 described previously in conjunction with FIG. 5.

Once the build up or the sandwich comprising the lower half 14 of the fairing skin is completed, the two mold halves 60 and 70 for the respective upper and lower portions of the airfoil are fitted, as indicated in FIG. 11. The two parts 60 and 70 of the mold then are closed together, with the mold half 70 for the lower part of the wing being folded or rotated in the direction of the arrow relative to the mold half 60 to secure the two mold halves together in any suitable conventional fashion, as illustrated in FIG. 12. The alignment pins 61 are inserted into mating holes 71 in the mold half 70. An end cap 74 then is placed over the open end of the mold and the cap is secured in place. Once this has been effected, the mold is heated in any suitable manner, either by placing it in an oven or by utilizing the mold halves 60 and 70 in a mold press, which applies heat to the metal sections 60 and 70 constituting the mold. The temperature to which the sections 60 and 70 is heated and the duration of time utilized for the cure is dependent upon the particular resin content used in the pre-preg fiber materials. Standard techniques are used to determine the time and temperature required for the curing step. It should be noted, however, that during the curing step all of the airfoil components fuse together and are cured together as a single, integral unit. This includes the spar boxes 16 and the support 50/51, as well as any other longitudinal spars or supports which are used in the airfoil. In addition, it should be noted that the syntactic foam expands and fills the regions which are not provided with any significant pressure from the resilient mandrels or plugs 64 through 68, such as at the leading edge and trailing edge of the airfoil.

After the curing step has been completed, the end cap 74 is removed from the mold halves; and the two halves 60 and 70 are opened. The airfoil 10 then is removed from the mold. The final step is the removal of the elongated resilient mandrels 64 through 68, as illustrated in FIG. 14. This is effected by grasping the exposed end of the resilient mandrels 64 through 68 with a pliers 76 or other suitable device. As illustrated in FIG. 14, this is shown for the mandrel 64, which is pulled in the direction of the arrow by the pliers 76 relative to the airfoil. This causes the mandrel 64 (and the other mandrels 65 through 68) to stretch longitudinally. During the longitudinal stretching of the mandrel 64, its cross-sectional configuration contracts to permit relatively easy withdrawal of the mandrel from the finished cured airfoil. This stretching withdrawal of each of the mandrels 64 through 68 is effected, either simultaneously or consecutively to remove the mandrels, leaving the airfoil in the configuration shown in FIG. 1. The resultant product is an airfoil which is a one-piece molded airfoil made of lightweight composite materials. No secondary bonding between the upper and lower fairing skins 12 and 14 of the airfoil is necessary, since the fairing skins and the internal structure (including the spar box 16) all are cured together. The entire airfoil is made of "raw" material without any pre-cured parts being used. The structural integrity of the airfoil is excellent.

The foregoing description of the preferred embodiment of the invention should be considered as illustrative and not as limiting. For example, the specific dimensions given for various components may be changed for different types and sizes of airfoils for different uses. The number of plies or layers of materials used also will vary, dependent upon the specific structural requirements of any particular airfoil. Various changes and modifications will occur to those skilled in the art for performing substantially the same method, in substantially the same way, to achieve substantially the same result without departing from the true scope of the invention as defined in the appended claims.

What is claimed is:

1. A method of manufacturing a hollow airfoil, open at least at one end, with integral reinforcing members including the steps of:

providing an open mold having a cavity therein, opposite surfaces of which define an outer shape of said airfoil;

placing precut sheets of pre-preg fiber material on opposite surfaces of said mold cavity;

placing at least two adjacent elongated resilient mandrels over said precut sheets of pre-preg fiber on one of said opposite surfaces of said mold cavity to press said sheets into contact with said mold upon subsequent closure thereof;

placing an elongated web of pre-preg fiber material between said adjacent mandrels and in contact therewith to cause opposite edges thereof to contact said sheets of pre-preg fiber material on opposite sides of said mold cavity;

placing a layer of cell core material between said precut sheets of pre-preg fiber material to form a sandwich construction consisting of at least one layer of pre-preg fiber material on each side of a layer of said cell core material;

placing syntactic expandable foam material between said precut sheets of pre-preg fiber material comprising each of said sandwich construction in at least a region of said mold where said precut sheets of pre-preg fiber material on opposite surfaces of said mold cavity contact one another upon closure of said mold;

closing said mold and applying heat thereto to cure said pre-preg fiber material and to bond said elongated web with said precut sheets;

removing said airfoil from said mold cavity; and pulling said resilient mandrels from the open end of said airfoil to stretch and contract said mandrels as they are removed from said airfoil.

2. The method according to claim 1 wherein said elongated resilient mandrels extend beyond at least one end of said precut sheets of pre-preg fiber material for facilitating the step of pulling said mandrels from said airfoil.

3. The method according to claim 2 wherein said pre-preg fiber material is pre-impregnated with a thermosetting resin.

4. The method according to claim 3 further including placing elongated structural stiffener rods between said first and second layers of said sandwich construction at the time said core material is placed therein, said stiffener rods being made of a material which bonds to said pre-preg fiber material on each side of said layer of cell core material during the heat applying step.

5. The method according to claim 1 further including placing elongated structural stiffener rods between said first and second layers of said sandwich construction at the time said core material is placed therein, said stiffener rods being made of a material which bonds to said pre-preg fiber material on each side of said layer of cell core material during the heat applying step.

6. The method according to claim 1 wherein said pre-preg fiber material is pre-impregnated with a thermosetting resin.

\* \* \* \* \*